June 9, 1936. E. A. ZEMPEL 2,043,689
BORING TOOL
Filed June 21, 1935
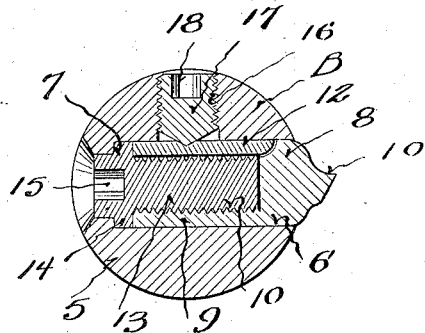
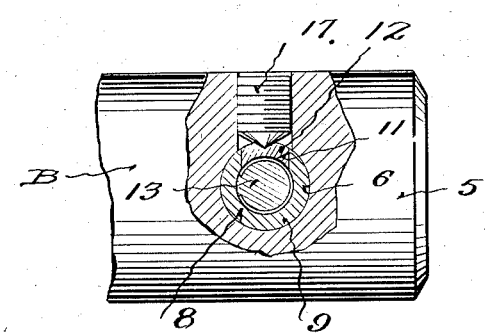
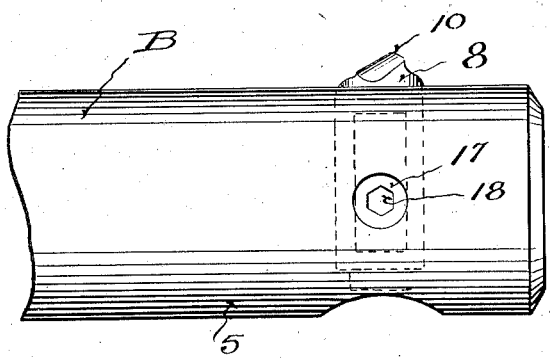
Inventor
E. A. Zempel
By
Attorneys Patented June 9, 1936

2,043,689

UNITED STATES PATENT OFFICE 2,043,689

BORING TOOL

Edward A. Zempel, Milwaukee, Wis., assignor of one-half to Carol Tillotson, Milwaukee, Wis.

Application June 21, 1935, Serial No. 27,665

2 Claims. (Cl. 77—58)

This invention appertains to tools, and more particularly to an improved boring tool having an adjustable cutter.

One of the primary objects of the invention is the provision of novel means for accurately adjusting the cutter tool to ten thousandths of an inch without danger of the tool slipping from its adjusted position during use.

Another salient object of my invention is the provision of a boring tool embodying an improved adjustment for the cutter, whereby the cutter will be tightly held, and whereby the necessity of loosening or tightening a set screw will be entirely eliminated.

A further important object of the invention is the provision of a boring tool embodying a boring bar having a diametrically extending bore or opening for receiving the cutter and the adjusting screw therefor, with a novel key or spline member for frictionally engaging the screw, and for positively engaging the cutter, whereby turning movement of the tool in the bar is prevented, and whereby accurate adjustment of the cutter can be had by the mere turning of the adjusting screw, without danger of the tool moving from said adjusted position.

A still further object of the invention is to provide an improved boring tool of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:—

Figure 1 is a diagrammatic section through a boring tool constructed in accordance with the invention.

Figure 2 is a fragmentary side elevation of the boring tool, with parts thereof broken away and in section to illustrate the set screw for frictionally holding the key or spline piece in section.

Figure 3 is a fragmentary side elevation of the boring tool, looking at right angles from Figure 2.

Referring to the drawing in detail, wherein similar reference characters designate corresponding parts throughout the several views, the letter B generally indicates the improved boring tool, which comprises an elongated, cylindrical boring bar 5. This boring bar 5, adjacent to its forward end, is provided with a diametrically extending bore or opening 6. The bore 6 is reduced at one end to provide an internal shoulder 7, the purpose of which will be later set forth.

Slidably mounted within the bore 6 is the tool or cutter 8. In the present instance, the cutter 8 is shown to include a cylindrical shank 9, and an integral cutter point 10. However, the cutter point 10 can be set into the shank in any desired manner. The end of the shank 9 of the cutter tool 8 is provided with an inwardly directed, internally threaded bore 11, and the threads can be formed relatively fine. Along one side of the shank I provide a longitudinally extending slot or keyway 11, which opens into the bore 10. Fitted within the slot or keyway 11 is an elongated key or spline piece 12, the purpose of which will be later set forth.

An adjusting machine screw 13 is threaded into the threaded bore 10 of the tool 8, and the outer end of the screw 13 is provided with a head or outwardly projecting annular flange 14. This flange 14 is adapted to engage the inner end of the cutter tool 8, and the shoulder 7 formed in the bore 6. The head of the adjusting screw 13 is provided with a polygonal socket 15 for the reception of a suitable wrench or a screw-driver slot (not shown), whereby the adjusting screw can be turned.

The boring bar 5, at right angles to the bore 6, is provided with an internally threaded opening 16, which intersects the bore 6, and this opening 16 receives the set or tension screw 17. The set or tension screw 17 can also be provided with an internal socket 18 for permitting the turning thereof by a suitable tool.

The inner end of the set screw 17 is adapted to impinge against the key or spline piece 12, to hold the same against longitudinal movement in the bore, and against turning movement. The outer face of the key or spline piece 12 can be provided with a recess for receiving the inner cone point or end of the set or tension screw 17.

From the foregoing description, it can be seen that the adjusting screw 13 is held against longitudinal movement in the bore 6 between the key or spline piece 12 and the internal shoulder 7, but that the adjusting screw is free for rotation. During the rotation of the adjusting screw 13 the tool 8 will be moved inwardly or outwardly in the bore 6, according to the direction of rotation of the adjusting screw, whereby the tool can be finely or accurately adjusted. Frictional engagement of the key or spline piece with the cutter 8 and the screw 13 prevents accidental movement of the cutter and the adjusting screw, and consequently the cutter 8 is firmly held in an adjusted position against slipping movement.

The key or spline piece frictionally engages the adjusting screw with the desired tension, and takes up loose play.

In Figure 1 the cutter is shown in its innermost position, and, consequently, upon turning of the adjusting screw in the correct direction, the cutter can be moved outwardly. By providing this simple arrangement I can bring about the accurate adjustment of the cutter, without danger of slipping, by the mere adjustment of the screw 13, and without the necessity of loosening or tightening any set screws and the like.

If preferred, the outer face of the boring bar 5 around the bore can be graduated, and the head of the screw 13 can be provided with a pointer, whereby to permit the turning of the adjusting screw the desired distance, to bring about the correct and desired adjustment of the cutter 8.

Changes in details may be made without departing from the spirit or scope of my invention, but what I claim as new is:

1. A boring tool comprising a bar having an opening therein provided with an internal shoulder, a tool slidably mounted in the bore having an internally threaded bore and a longitudinally extending keyway communicating with said bore, an adjusting screw rotatably mounted in the opening and fitted in the threaded bore having a flange engaging the shoulder, a key fitted in the keyway engaging the walls thereof and the screw, and means engaging the key for frictionally holding the same in the keyway and against said screw, said key also engaging said flange.

2. A boring tool comprising a bar having an opening therethrough provided with an internal shoulder, a tool slidably fitted in said opening having an internally threaded bore and a longitudinally extending keyway communicating with said bore and opening out through the inner end of the tool, an adjusting screw rotatably mounted in the opening and threaded in said bore having an outstanding flange engaging the shoulder, a longitudinally extending key fitted in the keyway against said flange, and a set or cone point tension screw threaded into the bar for engaging said key.

EDWARD A. ZEMPEL.